(12) United States Patent
Dolgin et al.

(10) Patent No.: US 9,395,447 B2
(45) Date of Patent: Jul. 19, 2016

(54) ORIENTATION MEASUREMENTS FOR DRIFT CORRECTION

(71) Applicant: Raytheon Company, Waltham, MA (US)

(72) Inventors: Benjamin Dolgin, Alexandria, VA (US); Sarah E. Law, Denver, CO (US); Joanne M. Attridge, Littleton, MA (US); Preethi Pratap, Boxborough, MA (US); David C. Fisher, Evergreen, CO (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/567,697

(22) Filed: Dec. 11, 2014

(65) Prior Publication Data

US 2016/0170030 A1    Jun. 16, 2016

(51) Int. Cl.
| | | |
|---|---|---|
| *G01S 1/00* | (2006.01) | |
| *G01S 3/02* | (2006.01) | |
| *H04W 24/00* | (2009.01) | |
| *G01S 19/41* | (2010.01) | |
| *G01S 19/49* | (2010.01) | |

(52) U.S. Cl.
CPC *G01S 19/41* (2013.01); *G01S 19/49* (2013.01)

(58) Field of Classification Search
USPC .................. 701/470; 342/451; 455/456.1
See application file for complete search history.

(56) References Cited

U.S. PATENT DOCUMENTS

| | | | | |
|---|---|---|---|---|
| 5,969,674 | A  * | 10/1999 | von der Embse | G01S 13/003 342/357.2 |
| 7,340,259 | B2 * | 3/2008 | Maloney | G01S 5/12 455/456.1 |
| 8,213,957 | B2 * | 7/2012 | Bull | G01S 5/02 370/328 |
| 2004/0032364 | A1 * | 2/2004 | Saucier | G01S 3/023 342/174 |
| 2006/0087475 | A1 * | 4/2006 | Struckman | G01S 5/12 342/451 |
| 2006/0114157 | A1 * | 6/2006 | Kolanek | G01S 3/46 342/424 |
| 2008/0186235 | A1 * | 8/2008 | Struckman | G01S 5/0221 342/465 |
| 2014/0327571 | A1 * | 11/2014 | Westcott | G01S 5/02 342/351 |

* cited by examiner

*Primary Examiner* — Thomas G Black
*Assistant Examiner* — Tyler Paige (57) ABSTRACT

Technology for measuring orientation is described. Signals can be received from a signal source having a known location via at least two antennas of the interferometer that are separated by a predefined distance. A delay between receiving the signals from the signal source at the at least two antennas of the interferometer can be calculated. A line of bearing (LOB) of the interferometer with respect to the signal source can be determined based on the delay between receiving the signals at the at least two antennas from the signal source. The orientation of the interferometer can be measured in a global coordinate system using the LOB of the interferometer with respect to the signal source.

20 Claims, 5 Drawing Sheets

ORIENTATION MEASUREMENTS FOR DRIFT CORRECTION

BACKGROUND

Navigation techniques can be used to monitor and control a movement of an object (e.g., a car, an airplane) from one place to another. The navigation techniques can involve a determination of current position and direction of the object. Some navigation techniques can involve using radio signals, radar or satellite signals to determine the current position and direction of the object. For example, a global positioning system (GPS) receiver can determine a current location using time signals transmitted along a line of sight from navigation satellites. Another example of a navigation technique is inertial navigation, wherein a plurality of sensors (e.g., accelerometers, gyroscopes) can be used to continuously calculate a current position, orientation and velocity of a moving object via dead reckoning.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly and is not intended to identify key features or essential features of the technology, nor is it intended to limit the scope of the claimed subject matter.

A technology is described for reducing drift of components within an inertial navigation system (INS), which is also referred to as an inertial navigation unit (INU/INS). The INS can be used to guide a moving object, such as a vehicle or a self-propelled guided weapon (e.g., a missile). The drift of gyroscopes and/or accelerometers inside the INS can reduce an accuracy of the INS over a period of time. In other words, the drift can cause the INS to inaccurately determine a current location, thereby resulting in the moving object traveling to an unknown or undesired location. Therefore, independent measurements of location, velocity and/or orientation can be performed over time to reduce the negative effects caused by the drift. In one example, an interferometer on the moving object can be used to measure line of bearings (LOBs) between the interferometer and one or more satellites of a known location. The interferometer can be operable to receive electromagnetic waves from the one or more satellites. The satellites can be non-cooperative satellites or cooperative satellites. The INS can use the LOBs in order to obtain independent measurements of orientation for the interferometer on the moving object. The accuracy of the orientation measured using the satellites can be within 0.001 degrees, even when the location of the satellite is poor (e.g., within a few kilometers). As a result, the effect of drift on the gyroscopes and accelerometers can be limited in inertial navigations systems.

Inertial navigation systems (INS) are navigation systems that use motion sensors (e.g., accelerometers) and rotation sensors (e.g., gyroscopes) to continuously calculate a position, orientation and velocity (e.g., direction and speed of movement) of a moving object without using external references. Current inertial navigation systems can calculate the position, orientation and velocity using dead reckoning, i.e., calculating one's current position by using a previously determined position and advancing that position based upon known or estimated speeds over a period of time. The INS can be used to guide a number of moving objects, such as aircraft, submarines, spacecraft, and guided missiles. The inertial navigation system can use the motion sensors and rotation sensors to track the object's position and orientation relative to a known starting point (e.g., an initial start location). The INS can be provided with a known starting point from another source, such as a human operator or a global positioning system (GPS) receiver. The INS can subsequently compute its own position and velocity by integrating information received from the motion sensors and rotation sensors. An advantage of inertial navigation systems is that no external references are generally needed to determine the position, orientation and velocity once the INS has been initialized.

However, prior inertial navigation systems can suffer from integration drift or cumulative error. These relatively small errors in the measurement of acceleration and angular velocity are integrated into progressively larger errors in velocity, which are compounded into greater errors in position. Since the new position is calculated from the previous calculated position and the measured acceleration and angular velocity, these errors accumulate and grow over time. In one example, the accuracy of prior inertial navigation system can diverge in approximately 15 to 45 minutes. In particular, inaccurate orientation measurements due to gyroscope drift are common sources of error in prior inertial navigation systems.

Therefore, in previous inertial navigation systems, the position can be periodically corrected by input from another type of navigation system. For example, measurements of the inertial navigation system can be compared with those of other positioning, velocity and direction measuring tools, such as GPS. Alternatively, the output of the INS can be corrected using local references, such as terrain, target landmarks or local beacons. The use of local references to correct for drift can be imprecise (e.g., when flying over an ocean). In addition, GPS can be unavailable or unreliable in certain situations (e.g., when GPS signals are spoofed). As an example, if electronics onboard an aircraft are disrupted and the INS is resetting, the aircraft can be lost, i.e., the aircraft does not know its orientation or a current location.

As described in further detail below, the effect of drift in inertial navigation systems can be limited or reduced by using, in part, signals from non-cooperative satellites in orbit to update the orientation of the inertial navigation system, thereby reducing the drift.

Figure 1:
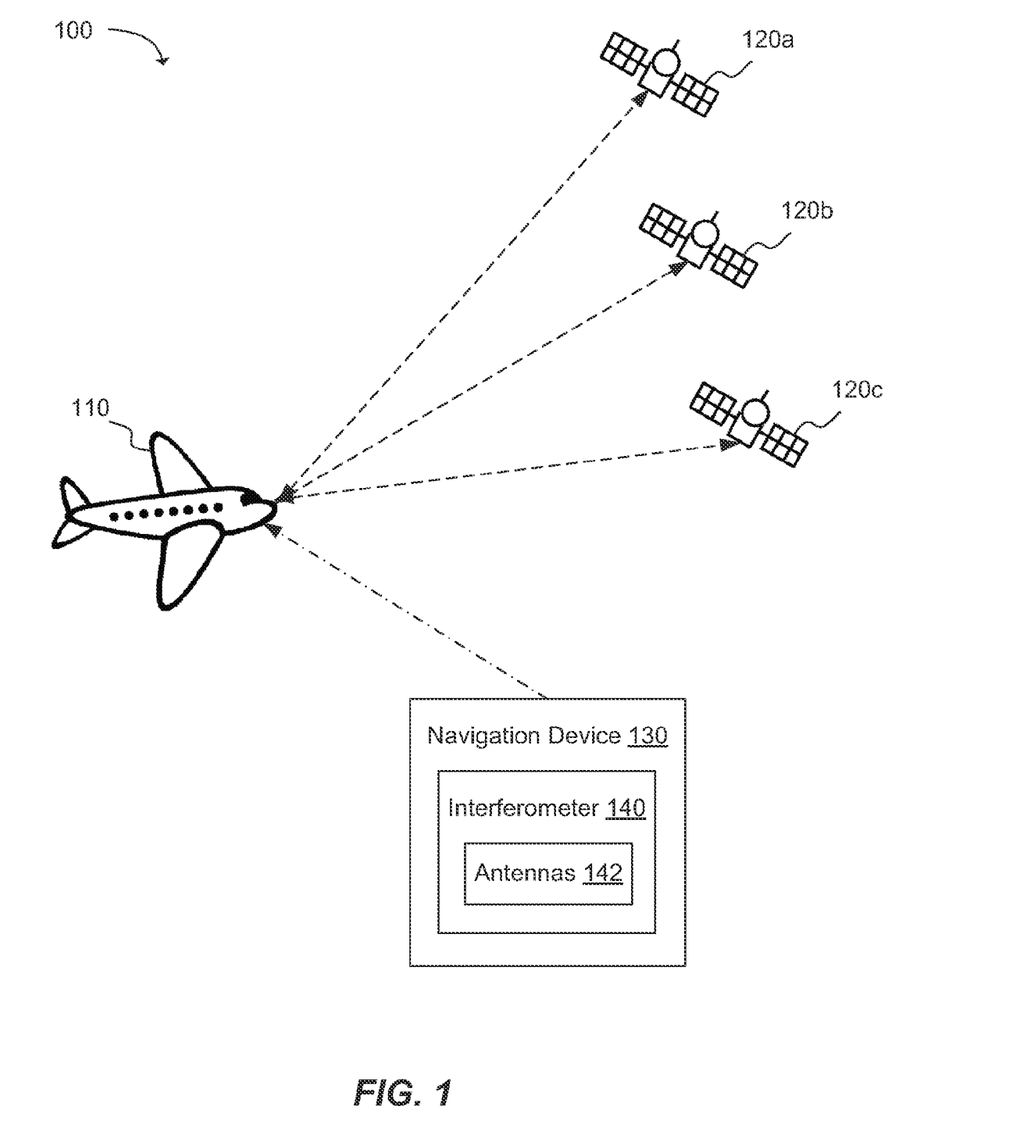
FIG. 1 illustrates a diagram of a navigation device measuring an orientation of a navigation device using signals from a signal source and using the orientation to reduce drift at the navigation device in accordance with an example.

FIG. 1 illustrates a diagram 100 of a navigation device 130 that operates on an object 110. The navigation device 130 can measure an orientation using signals from signal sources 120a-c. The navigation device 130 can use the orientation to reduce drift at the navigation device 130. In one example, the orientation measured at the navigation device 130 can refer to an orientation of an interferometer 140 within the navigation device 130. The signal sources 120a-c can act as a beacon to enable the navigation device 130 to determine the orientation. As previously described, an accuracy of orientation measurements at the navigation device 130 can diverge over time. Therefore, independent measurements of orientation via the signal sources 120a-c can reduce the effects of drift at the navigation device 130. In other words, the independent orientation measurements can be used to periodically update the navigation device 130, such that the navigation device 130 maintains a sufficient accuracy level.

In one example, the object 110 can include a moving object, such as a vehicle (e.g., an aircraft) or a self-propelled guided weapon (e.g., a missile), or other objects as recognized by those skilled in the art. The navigation device 130 can be on board the object 110. The navigation device 130 can be an inertial navigation system (INS) 130. The navigation device 130 can include motion sensors (e.g., accelerometers) and rotation sensors (e.g., gyroscopes) to continuously calculate a position, orientation and velocity (e.g., direction and speed of movement) of the object 110.

The signal sources 120a-c can be geostationary Earth orbit (GEO) satellites, medium Earth orbit (MEO) satellites, low Earth orbit (LEO) satellites, ground transmitters, or a combination thereof. The signal sources 120a-c can include non-cooperative satellites or cooperative satellites. In general, non-cooperative satellites do not include GPS satellites that establish handshakes and provide information about them. Rather, non-cooperative satellites can transmit information without knowledge that the navigation device 130 is listening to the transmissions of the non-cooperative satellite. Examples of non-cooperative satellites can include communication satellites, weather satellites, foreign satellites, etc. The non-cooperative satellites do not know they are being used for navigation, and therefore, the non-cooperative satellites cannot spoof themselves. The non-cooperative satellites can be used for navigation as long as the non-cooperative satellites transmit and do not actively try to change orbit. Cooperative satellites can include GPS satellites.

The signal sources 120a-c can be at a known location. In other words, the navigation device 130 can know the locations of the signal sources 120a-c (e.g., non-cooperative satellites) based on an almanac. If the signal source is a cooperative satellite, the navigation device 130 does not previously need to know the signal sources' location because the cooperative satellite can transmit its location to the navigation device 130. In addition, the navigation device 130 can know transmission characteristics (e.g., carrier frequency) of the signals transmitted from the signal sources 120a-c. The transmission content itself can be enciphered with no key provided. In other words, the navigation device 130 does not need the information that is being transmitted in the signals from the signal sources 120a-c (e.g., weather information). In general, the navigation device 130 can calculate the orientation of the interferometer 140 using signal sources with known locations and known transmission characteristics. The navigation device 130 can determine the locations of the signal sources 120a-c using an almanac that provides the positions/locations of the signal sources 120a-c at a given time. In other words, the satellite locations can be obtained independently by a tracking station, without cooperation of the signal sources 120a-c, and provided in ephemerides.

In one configuration, the interferometer 140 within the navigation device 130 can also be referred to as a phase array. In other words, the navigation device 130 can use interferometric techniques to determine the orientation of the interferometer 140. Since the interferometer 140 is on the object 110, the interferometer's orientation can indicate the object's orientation. The navigation device 130 can determine the interferometer's orientation with respect to the signal sources 120a-c using transmissions from the signal sources 120a-c.

In one example, the interferometer's orientation can be determined through a line of bearing (LOB) determination, e.g., the LOB of the interferometer 140 on the navigation device 130 with respect to the signal sources 120a-c (i.e., reference beacons). The LOB (in degrees) is an angle between a forward direction of the interferometer 140 (or the object 110) and a direction to another object (e.g., the signal sources 120a-c). In other words, the LOB is the angle between the forward direction of the interferometer 140 (or the object 110) and a line towards the other object (e.g., the signal sources 120a-c). The LOB refers to the direction of the other object, as seen from a perspective of the interferometer 140 (or the object 110). The navigation device 130 can use interferometric techniques to determine the LOBs of the interferometer 140 with respect to the signal sources 120a-c. If the navigation device 130 knows the locations of the signal sources 120a-c and the LOBs to the signal sources 120a-c, the navigation device 130 can determine the current orientation of the interferometer 140 in a global coordinate system. Therefore, the navigation device 130 can update a previous orientation (that is possibly inaccurate due to gyroscope drift) with the current orientation and the navigation device 130 can be restarted in order to use the current orientation.

The interferometer 140 (also known as the phase array) can be formed from elements that comprise at least two receiving antennas 142. The receiving antennas 142 can be characterized by five spatial variables related to location and orientation, as well as one scalar variable related to a predefined distance separating the receiving antennas 142 (or receivers). The predefined distance can also be referred to as an effective (i.e., electromechanical) distance between the receiving antennas 142. In one example, the predefined distance can be calibrated independently. In addition, the receiving antennas 142 can be both oriented at substantially the same angle.

The receiving antennas 142 can receive a signal from the signal source 102a. Since the receiving antennas 142 are at separate points (i.e., the receiving antennas 142 are separated by the predefined distance), the signal can be received at different times for the various receiving antennas 142. In other words, one antenna can receive the signal from the signal source 102*a* slightly before or slightly after the other antenna receives the signal from the signal source 102*a*. Since the signals transmitted from the signal source 102 are electromagnetic signals traveling at approximately the speed of light, the times of arrival for the receiving antennas 142 can differ depending on a distance the signal has to travel to reach each of the receiving antennas 142. As a non-limiting example, the distance between the signal source 102*a* and an antenna A (or a first antenna) can be slightly greater than the distance between the signal source 102*a* and an antenna B (or a second antenna). Therefore, when the signal source 102 transmits the signal, the time of arrival for antenna A is slightly greater than the time of arrival for antenna B.

The difference in times of arrival between the receiving antennas 142 (or the delay between the times of arrival) can be related to the cosine of the angle of bearing (or LOB) of the receiving antennas 142 with respect to the signal source 102*a* at the known location. In other words, the angle is the LOB between the antennas 142 that form the interferometer 140 and the signal source 102*a*. The cosine of the LOB can be determined using the delay between the times of arrival of the signal at the antennas 142. In one example, the LOB can be determined using $\cos(\alpha) = (c \cdot \Delta t)/d$, wherein $\alpha$ is the angle of the antennas' orientation with respect to the signal source 102*a* (also known as the LOB), c is the speed of light, $\Delta t$ is the delay between the times of arrival of the signal at the antennas 142, and d is the predefined distance between the antennas 142.

In one example, the interferometer 140 can measure LOBs to a plurality of signal sources, e.g., the cosine of the bearings to multiple signal sources. For example, the interferometer 140 can receive signals from the signal source 102*b* and the signal source 102*c*. The interferometer 140 can measure the LOB to the signal source 102*b* based on the delay in times of arrival of the signal at the antennas 142. In addition, the interferometer 140 can measure the LOB to the signal source 102*c* based on the delay in times of arrival of the signal at the antennas 142. The navigation device 130 can use the multiple LOBs measured, via the interferometer 140, in order to determine the orientation of the interferometer 140. In other words, if the location of several landmarks (e.g., signal sources) is known and the bearing from a current location (e.g., the interferometer's current location) to those landmarks is known, then the interferometer's orientation (or absolute orientation) can be determined with respect to the known orientations of the landmarks. Once the current orientation of the interferometer 140 is determined for a global coordinate system, the current orientation can replace a previous or outdated orientation. In other words, the current orientation can be used to correct the gyroscopes and/or accelerometers in the navigation device 130 or restart the navigation device 130.

In one configuration, the interferometer 140 can measure at least two LOBs for two satellites simultaneously in order to determine the absolute orientation of the interferometer 140 in the global coordinate system. The orientation of the interferometer 140 can indicate the object's orientation as well (e.g., the aircraft's orientation). In another example, the interferometer 140 can measure a first LOB to a first signal source, and at a later time, measure a second LOB to a second signal source. In other words, the interferometer 140 can measure $\cos(\alpha_1)$ to a first known location, and at a later time, measure $\cos(\alpha_2)$ to a second known location. In this example, the navigation device 130 can correct gyroscope drift based on the orientation of the interferometer 140 determined using the first LOB and the second LOB, even though the first LOB and the second LOB were not measured simultaneously.

In line of bearing (LOB) navigation, the object's location and orientation (e.g., the location and orientation of an aircraft) can be determined through a determination of LOBs to reference beacons in the object's coordinate system. The accuracy of the LOB navigation can be expressed as a sum of two terms: Orientation accuracy=LOB accuracy+Location accuracy/Distance to Beacons. When satellites are used as the beacons, the above expression means: Orientation accuracy=LOB accuracy+Geolocation accuracy/Distance to Satellite. The orientation accuracy refers to an accuracy level of the interferometer's orientation (or object's orientation). The LOB accuracy refers to an accuracy level of the LOB of the antennas 142 with respect to the signal sources 120*a-c*. The geolocation accuracy refers to the accuracy of an interferometer location on Earth and the satellites in orbit. The distance to the satellites can refer to a distance between the interferometer 140 (or the object 110) and the signal sources 120*a-c*. When GEO satellites or MEO satellites are used, an LOB with an acceptable accuracy level (e.g., one arc second, or five microradians, or 0.003 degrees) can be achieved when the locations are known within 100 m to 200 m. As an example, the accuracy of the LOB navigation described herein can be within 0.001 degrees.

The accuracy with which the ratio $(c \cdot \Delta t)/d$ can be measured is determined by the carrier wavelength of the signal received from the signal carriers 120*a-c*. In addition, the accuracy with which the value of $c \cdot \Delta t$ can be measured depends on the electromechanical stability of the antennas 142 and the wavelength of the radiation, and the Signal to Noise Ratio of the received signal.

In one configuration, the difference in time of arrival (i.e., $(c \cdot \Delta t)$) for the signal received at the multiple antennas 142 (e.g., two or more antennas 142) from the signal source 102*a* can be determined using group delay or phase delay. In group delay, the delay between a first antenna of the interferometer 140 receiving the signal from the signal source 102*a* and a second antenna of the interferometer 140 receiving the signal from the signal source 102*a* can be measured. For example, the first antenna can receive the signal in slightly less time than it takes the second antenna to receive the signal. This difference in time is the group delay. The accuracy for group delay can depend on the bandwidth of the signal being transmitted and the power of the transmitter (e.g., the signal source 102*a*).

In phase delay, rather than measuring the physical difference in time of arrival, the difference in a phase of the carrier frequency that the signal source 102*a* is transmitting can be measured. Phase delay can measure the phase difference of a single frequency signal emitted from the signal source 102*a*. For example, the first antenna can receive the signal at a particular phase and the second antenna can receive the signal at a later phase. The difference in phases is referred to as the phase delay. In other words, since the signal is an electromagnetic wave (e.g., a sine wave), the signal has a phase. The electromagnetic wave can first reach the first antenna and then reach the second antenna at a later time. The number of waves between the electromagnetic wave reaching the first antenna and the second antenna is the phase delay. Thus, the interferometer 140 can measure the delay (i.e., time delay or phase delay) in the signal reaching the various antennas 142 of the interferometer 140 from the signal source 102*a*.

In one example, phase delay can be more accurate than group delay, but phase delay does have drawbacks. A phase delay equaling a half wavelength can appear the same as 1.5 wavelengths to the receiver (i.e., the antennas 142 of the interferometer 140). The receiver may not know when a wavelength has been missed (i.e., the receiver may not know how many wavelengths in delay have been missed). In other words, phase delay generally does not allow for determination of how many integer periods of transmitter frequency have occurred between the times the radiation reached the antennas 142. Therefore, a combination of group delay and phase delay can be used to determine the difference in time of arrival (i.e., (c·Δt)). The group delay can provide a rough difference in time delay based on the relationship between the time measurements, and phase detection can provide refined time values.

Figure 2:
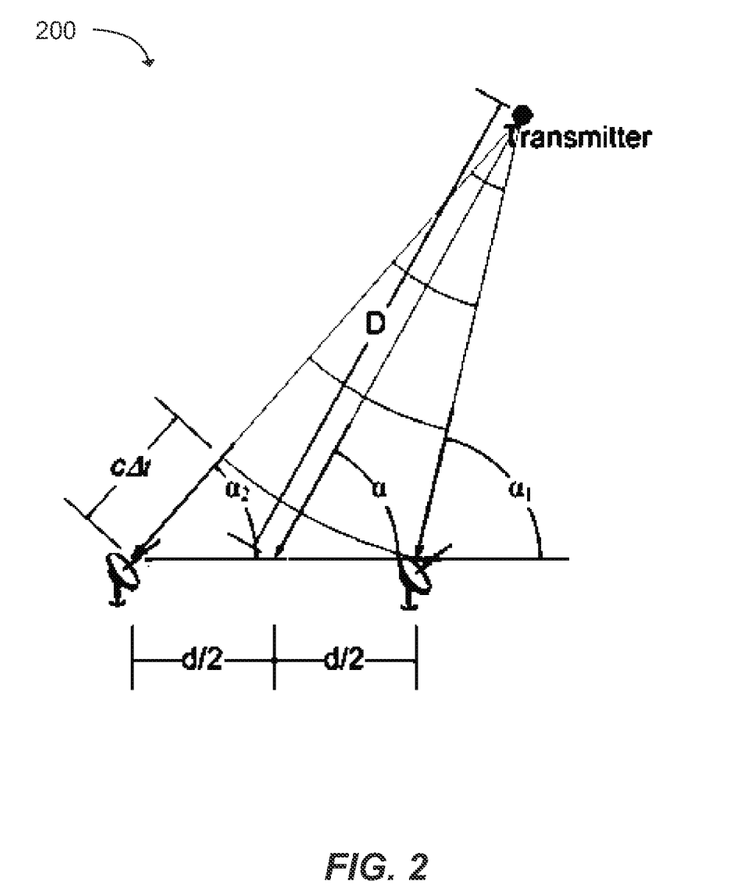
FIG. 2 illustrates a diagram of a pair of antennas receiving signals from a transmitter and using the signals to determine a line of bearing (LOB) of the antennas with respect to the transmitter in accordance with an example.

FIG. 2 illustrates a diagram of a pair of antennas receiving signals from a transmitter and using the signals to determine a line of bearing (LOB) at the antennas with respect to the transmitter. It is noted that the illustrated antennas are merely exemplary of the many different types of antennas contemplated herein, as will be recognized by those skilled in the art. In another configuration, a plurality of antennas (i.e., more than two antennas) can receive the signals from the transmitter. The pair of antennas shown in FIG. 2 can form an interferometer or a phase array. The interferometer can be aboard a moving object, such as an aircraft or missile, and be incorporated with a navigation device (e.g., an inertial navigation system).

The pair of antennas can receive signals from the transmitter with a known location. The signal of interest can be the time delay (c·Δt) between the signals being received at the antennas. For example, a first antenna in the pair of antennas can receive the signal either before or after the second antenna in the pair of antennas receives the signal. This time difference (or delay) is calculated using (c·Δt). In one example, $$c \cdot \Delta t = \sqrt{D^2 + d^2/4 + Dd \cdot \cos(\alpha)} - \sqrt{D^2 + d^2/4 - Dd \cdot \cos(\alpha)},$$

wherein c is the speed of light, Δt is the time delay, D is a distance between the transmitter (i.e., the signal source) and a midpoint between the first antenna and the second antenna, d is the distance between the first antenna and the second antenna, and α is the angle of the orientation of the first antenna and the second antenna with respect to the transmitter. The angle α is also known as the line of bearing (LOB), or bearing, of the antennas with respect to the transmitter.

If the distance d between the antennas is small compared to the distance to a satellite (i.e., d<<D), $$c \cdot \Delta t = d \cdot \cos(\alpha) = \vec{d} \cdot \hat{D} = \vec{d} \cdot \frac{\vec{R} - \vec{r}}{|\vec{R} - \vec{r}|},$$

wherein $\vec{d}$ is the vector connecting the effective positions of the antennas, $\hat{D}$ is the unit vector of the Line of Bearing (LOB) of the signal source (e.g., the satellite), $\vec{R}$ is location of the signal source, and $\vec{r}$ is the location of the midpoint between the antennas (e.g., the midpoint between the first antenna and the second antenna. A receiving dipole is thus fully characterized by five spatial variables ($\vec{r}$ and $\vec{d}/|\vec{d}|$) and one scalar variable: $d=|\vec{d}|$. Under some circumstances the value of d can be calibrated independently.

In one example, the interferometer can be used as a LOB detector, i.e., to detect the LOB of the interferometer with respect to the transmitter. The interferometer accuracy depends on the accuracy with which the value of c·Δt can be measured and the distance between the antennas of the interferometer. The c·Δt equation can be rewritten in terms of LOB accuracy: LOB accuracy=

$$\frac{c \cdot \Delta t_{accuracy}}{d}.$$

There can be two approaches to measure the value of c·Δt: phase delay and group delay. Phase delay measures a phase difference of a single frequency signal emitted by the transmitter. Phase delay measurements can be more accurate than group delay measurements, but in phase delay, the number of integer periods of transmitter frequency that occur between the times the radiation reached the antennas can be undeterminable. In other words, phase delay can have an ambiguity because wavelengths that are missed can be undetectable. The accuracy of phase delay can be represented as:

$$c \cdot \Delta t_{accuracy} = \frac{\lambda}{2\pi} \cdot \frac{1}{SNR},$$

wherein λ is the wavelength of the transmitter radiation, and the SNR is the Signal-to-Noise ratio at the interferometer receivers.

Group delay techniques can measure the time delay between times of arrival directly. Group delay does not have the ambiguity found in phase delay, but group delay can be less accurate than phase delay. The accuracy of group delay can be represented as $$c \cdot \Delta t_{accuracy} = \frac{\lambda}{2\pi} \cdot \frac{f}{\Delta f} \cdot \frac{1}{SNR},$$

wherein λ is the wavelength of the transmitter radiation, SNR is the Signal-to-Noise ratio at the interferometer receivers, f is the transmitter frequency, and Δf is the bandwidth of the received radiation. Therefore, LOB accuracy can be defined according to:

$$LOB \text{ accuracy phase detection} = \frac{\lambda}{2\pi d} \cdot \frac{1}{SNR}, \text{ and}$$

$$LOB \text{ accuracy group detection} = \frac{\lambda}{2\pi d} \cdot \frac{f}{\Delta f} \cdot \frac{1}{SNR} = \frac{c}{2\pi d \Delta f} \cdot \frac{1}{SNR}.$$

The SNR of the receivers (i.e., the antennas of the interferometer) can be determined by the fraction of the transmitted energy intercepted by the antenna divided by the intrinsic noise of the antenna/pre-amplifier. For dish antennas, the energy that is received can be proportional to the transmitted energy density per unit angle multiplied by the geometric angle at which the antenna is visible from the satellite. This formula can be adjusted for attenuation in atmosphere and in the receiver tract. The noise of the receiver can be approximated by the thermal noise of the ideal receiver. Combining these parameters the SNR of the receiver can be estimated as $$SNR = \frac{SA_e}{2k}\frac{\sqrt{t\Delta v}}{KT_{sys}},$$

where S=Flux density, Ae=the effective collecting area, k=Boltzmann's constant, t=integration time, Δv=Bandwidth, Tsys=system noise temperature, K=constant that depends on receiver type, and for an interferometer with N elements $K=1/\sqrt{(N(N-1))}$.

Figure 3:
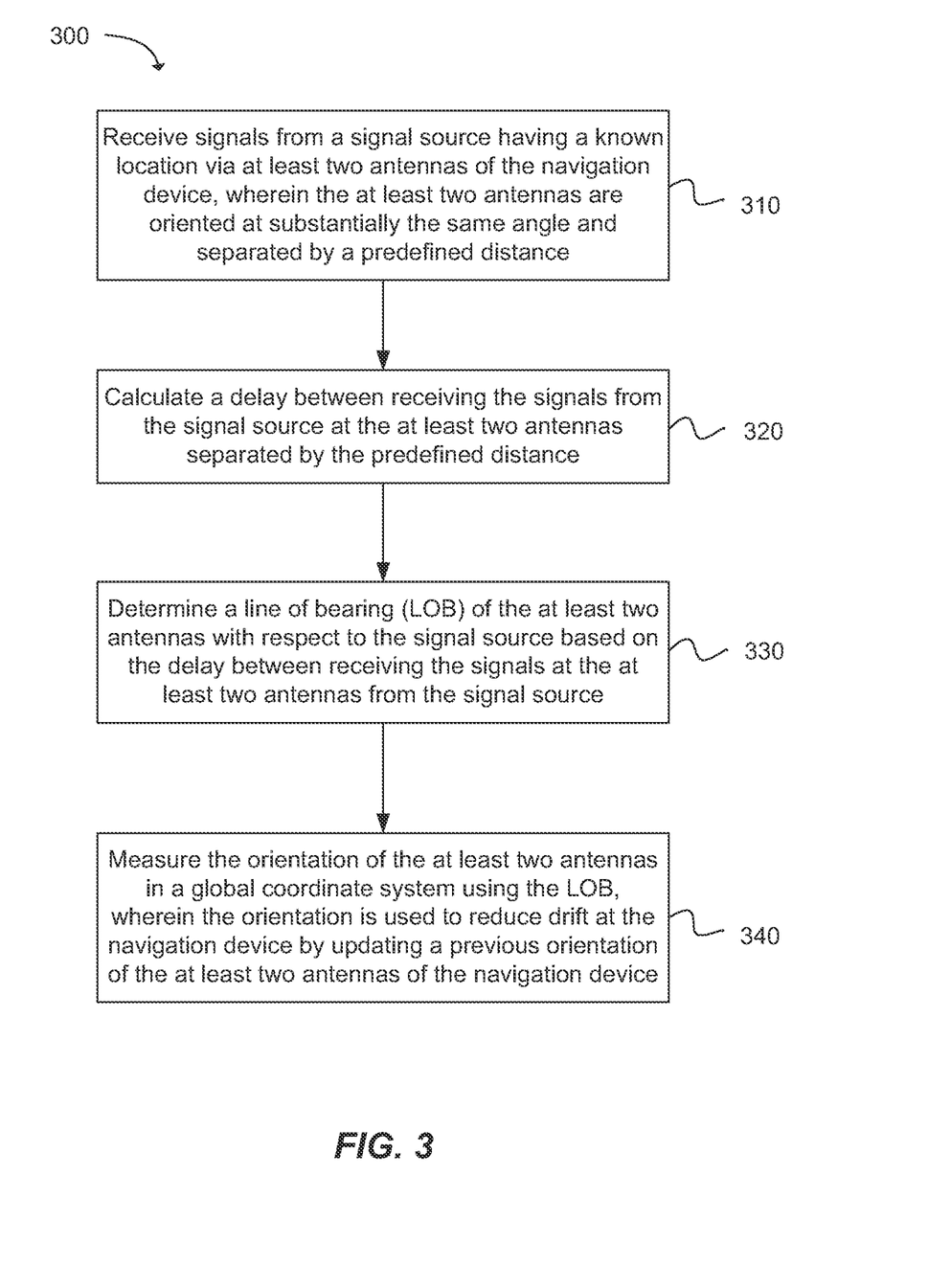
FIG. 3 depicts functionality of a navigation device operable to measure an orientation in accordance with an example.

FIG. 3 depicts functionality of a navigation device operable to measure an orientation. Signals from a signal source having a known location can be received via at least two antennas of the navigation device, wherein the at least two antennas are oriented at substantially the same angle and separated by a predefined distance, as in block 310. A delay between receiving the signals from the signal source at the at least two antennas separated by the predefined distance can be calculated, as in block 320. A line of bearing (LOB) of the at least two antennas at the navigation device with respect to the signal source can be determined based on the delay between receiving the signals at the at least two antennas from the signal source, as in block 330. The orientation of the at least two antennas of the navigation device can be measured in a global coordinate system using the LOB, wherein the orientation is used to reduce drift at the navigation device by updating a previous orientation of the at least two antennas of the navigation device, as in block 340.

In one example, the signals from the signal source can be received via at least two elements of a phased array at the navigation device. The at least two elements of the phased array can be oriented at substantially the same angle and separated by the predefined distance.

In one example, the navigation device can comprise an inertial navigation system (INS). In another example, the navigation device can further be configured to measure the orientation of the at least two antennas of the navigation device using a plurality of LOBs for the at least two antennas of the navigation device with respect to a plurality of signal sources. In yet another example, the at least two antennas of the navigation device can comprise elements of an interferometer or a phase array that is used to determine the delay between receiving the signals from the signal source.

In one aspect, the delay between receiving the signals from the signal source can be at least one of a phase delay or a group delay. In another aspect, the navigation device can operate within a self-propelled guided weapon or a vehicle. In yet another aspect, the delay between the signals being received at the at least two antennas from the signal source can be represented by c·Δt, wherein c is the speed of light and Δt is a difference between times of arrival for the signals that are received from the signal source.

In one configuration, c·Δt is equal to d·cos(α), wherein d represents the predefined distance between the at least two antennas and α represents the LOB of the at least two antennas with respect to the signal source. In another configuration, an accuracy of the delay can be represented by $$c \cdot \Delta t_{accuracy} = \frac{\lambda}{2\pi} \cdot \frac{1}{SNR},$$

wherein c is the speed of light, $\Delta t_{accuracy}$ is the accuracy of the delay, λ is a wavelength of a transmitter radiation and SNR is a Signal-to-Noise ratio at the at least two antennas. In yet another configuration, c·Δt can be equal to $$\sqrt{D^2 + d^2/4 + Dd \cdot \cos(\alpha)} - \sqrt{D^2 + d^2/4 - Dd \cdot \cos(\alpha)},$$

wherein D represents a distance from the at least two antennas to the signal source, d represents the predefined distance between the at least two antennas, and α represents the LOB of the at least two antennas with respect to the signal source. In addition, c·Δt can be equal to $\vec{d} \cdot \hat{D}$ or $$\vec{d} \cdot \frac{\vec{R} - \vec{r}}{|\vec{R} - \vec{r}|},$$

wherein $\vec{d}$ represents a vector connecting effective positions of the at least two antennas, $\hat{D}$ represents a unit vector of the LOB, $\vec{R}$ represents a position of the signal source, and $\vec{r}$ represents a location of a midpoint between the at least two antennas.

Figure 4:
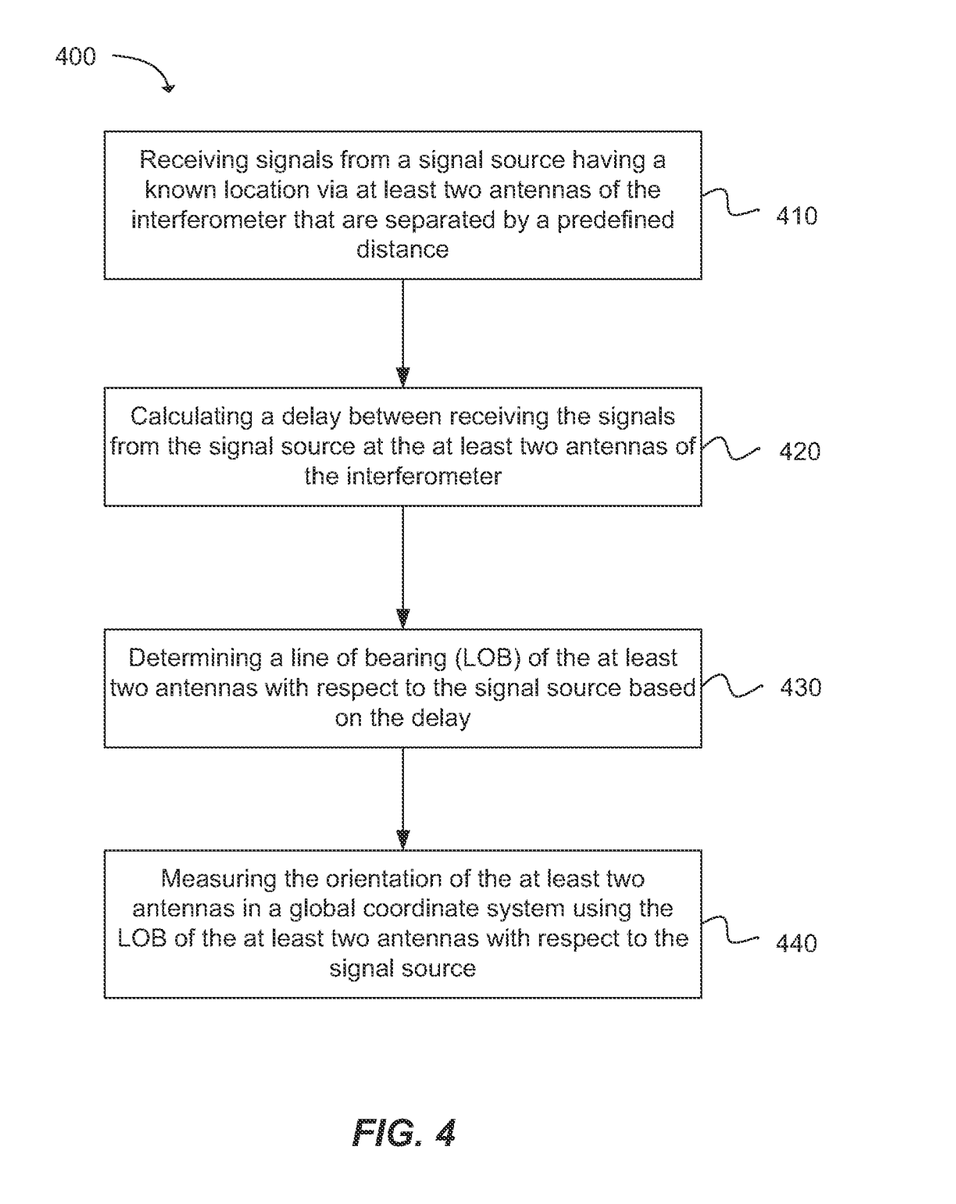
FIG. 4 depicts a flow chart of a method for measuring orientation of an interferometer in accordance with an example.

FIG. 4 depicts a flow chart of a method for measuring orientation of an interferometer. Signals can be received from a signal source having a known location via at least two antennas of the interferometer that are separated by a predefined distance, as in block 410. A delay between receiving the signals from the signal source at the at least two antennas of the interferometer can be calculated, as in block 420. A line of bearing (LOB) of the at least two antennas with respect to the signal source can be determined based on the delay between receiving the signals at the at least two antennas from the signal source, as in block 430. The orientation of the at least two antennas can be measured in a global coordinate system using the LOB of the interferometer with respect to the signal source, as in block 440.

In one aspect, the method further comprises measuring the orientation of the at least two antennas via an inertial navigation system (INS), wherein the INS navigates one of a vehicle or a self-propelled guided weapon. In another aspect, the method can further comprise measuring the orientation of the at least two antennas in order to reduce drift of one or more gyroscopes or accelerometers included in the INS. In yet another aspect, the method can further comprise measuring the orientation of the at least two antennas of the interferometer using multiple LOBs of the interferometer with respect to multiple signal sources.

In one example, the method can further comprise the operations of: calculating at least one of a phase delay or a group delay between receiving the signals at the at least two antennas of the interferometer from the signal source; and determining the LOB of the interferometer with respect to the signal source based on the phase delay or the group delay. In another example, the method can further comprise determining the known location of the signal source using an almanac.

Figure 5:
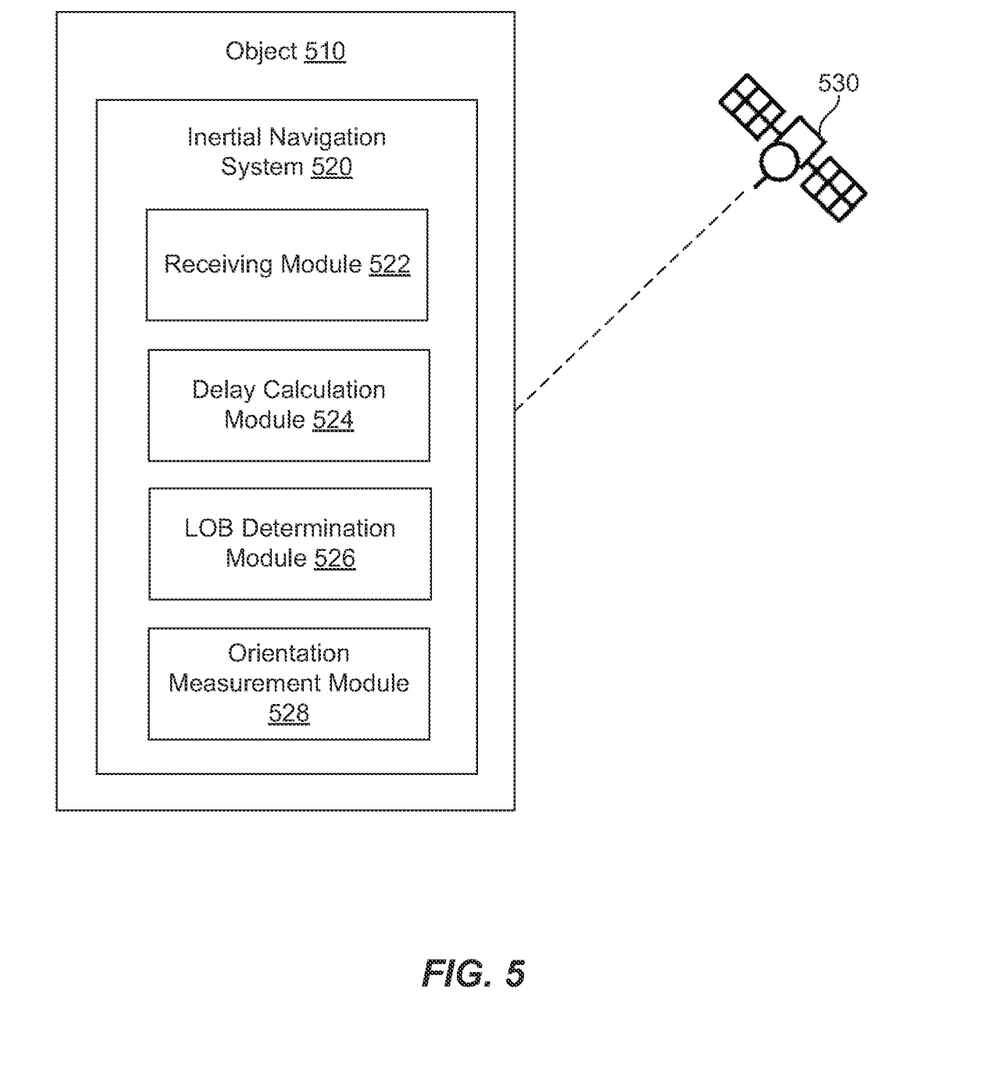
FIG. 5 depicts an inertial navigation system (INS) operable to measure an orientation using signals from a signal source.

FIG. 5 depicts an inertial navigation system (INS) 520 operable to measure an orientation using signals from a signal source 530. The INS 520 can operate on an object 510 (e.g., an aircraft, or other object). The INS 520 can include a receiving module 522 configured to receive signals from the signal source 530 having a known location via at least two antennas at the INS 520, wherein the at least two antennas are oriented at substantially the same angle and separated by a predefined distance. The INS 520 can include a delay calculation module 524 configured to calculate a delay between receiving the signals from the signal source 530 at the at least two antennas separated by the predefined distance. The INS 520 can include a line of bearing (LOB) determination module 526 configured to determine the LOB of the at least two antennas at the INS 520 with respect to the signal source 530 based on the delay between receiving the signals at the at least two antennas from the signal source 530. The INS 520 can include an orientation measurement module 528 configured to measure the orientation of the at least two antennas at the INS 520 in a global coordinate system using the LOB.

In one example, the signal source 530 is at least one of: a geostationary Earth orbit (GEO) satellite, a medium Earth orbit (MEO) satellite, a low Earth orbit (LEO) satellite or a ground transmitter. In another example, the signal source 530 includes a non-cooperative satellite or a cooperative satellite. In yet another example, the at least two antennas form an interferometer or a phase array that can be used to determine the delay between receiving the signals at the at least two antennas from the signal source 530.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The satellite may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for measuring an orientation at a navigation device, the method comprising:
   receiving signals from a signal source having a known location via at least two antennas of the navigation device, wherein the at least two antennas are oriented at substantially the same angle and separated by a predefined distance;
   calculating a delay between receiving the signals from the signal source at the at least two antennas;
   determining a line of bearing (LOB) of the at least two antennas with respect to the signal source based on the delay between receiving the signals at the at least two antennas from the signal source; and measuring the orientation of the at least two antennas in a global coordinate system using the LOB, wherein the orientation is used to reduce drift at the navigation device by updating a previous orientation of the at least two antennas of the navigation device.

2. The method of claim 1, wherein the navigation device is an inertial navigation system (INS).

3. The method of claim 1, further comprising measuring the orientation of the at least two antennas of the navigation device using a plurality of LOBs for the at least two antennas of the navigation device with respect to a plurality of signal sources.

4. The method of claim 1, wherein the at least two antennas of the navigation device comprise elements of an interferometer or a phase array that is used to determine the delay between receiving the signals from the signal source.

5. The method of claim 1, wherein the delay between receiving the signals from the signal source is at least one of a phase delay or a group delay.

6. The method of claim 1, wherein the navigation system operates within a self-propelled guided weapon or a vehicle.

7. The method of claim 1, wherein the delay between the signals being received at the at least two antennas from the signal source is represented by $c \cdot \Delta t$, wherein c is the speed of light and $\Delta t$ is a difference between times of arrival for the signals that are received from the signal source.

8. The method of claim 7, wherein $c \cdot \Delta t$ is equal to $d \cdot \cos(\alpha)$, wherein d represents the predefined distance between the at least two antennas and $\alpha$ represents the LOB of the at least two antennas with respect to the signal source.

9. The method of claim 7, wherein an accuracy of the delay is represented by $$c \cdot \Delta t_{accuracy} = \frac{\lambda}{2\pi} \cdot \frac{1}{SNR},$$

wherein c is the speed of light, $\Delta t_{accuracy}$ is the accuracy of the delay, $\lambda$ is a wavelength of a transmitter radiation and SNR is a Signal-to-Noise ratio at the at least two antennas.

10. The method of claim 7, wherein $c \cdot \Delta t$ is equal to $$\sqrt{D^2 + d^2/4 + Dd \cdot \cos(\alpha)} - \sqrt{D^2 + d^2/4 - Dd \cdot \cos(\alpha)},$$

wherein D represents a distance from the at least two antennas to the signal source, d represents the predefined distance between the at least two antennas, and $\alpha$ represents the LOB of the at least two antennas with respect to the signal source.

11. The method of claim 7, wherein $c \cdot \Delta t$ is equal to $\vec{d} \cdot \hat{D}$ or $$\vec{d} \cdot \frac{\vec{R} - \vec{r}}{|\vec{R} - \vec{r}|},$$

wherein $\vec{d}$ represents a vector connecting effective positions of the at least two antennas, $\hat{D}$ represents a unit vector of the LOB, $\vec{R}$ represents a position of the signal source, and $\vec{r}$ represents a location of a midpoint between the at least two antennas.

12. A method for measuring orientation, the method comprising:
receiving signals from a signal source having a known location via at least two antennas of an interferometer that are separated by a predefined distance;
calculating a delay between receiving the signals from the signal source at the at least two antennas of the interferometer;
determining a line of bearing (LOB) of the at least two antennas with respect to the signal source based on the delay; and
measuring the orientation of the at least two antennas in a global coordinate system using the LOB of the at least two antennas with respect to the signal source.

13. The method of claim 12, further comprising measuring the orientation of the at least two antennas via an inertial navigation system (INS), wherein the INS navigates one of a vehicle or a self-propelled guided weapon.

14. The method of claim 13, further comprising measuring the orientation of the at least two antennas in order to reduce drift of one or more gyroscopes or accelerometers included in the INS.

15. The method of claim 12, further comprising measuring the orientation of the at least two antennas using multiple LOBs of the at least two antennas of the interferometer with respect to multiple signal sources.

16. The method of claim 12, further comprising:
calculating at least one of a phase delay or a group delay between receiving the signals at the at least two antennas of the interferometer from the signal source; and
determining the LOB of the interferometer with respect to the signal source based on the phase delay or the group delay.

17. The method of claim 12, further comprising determining the known location of the signal source using an almanac.

18. An inertial navigation system (INS) operable to measure an orientation, the INS comprising:
a receiving module configured to receive signals from a signal source having a known location via at least two antennas at the INS, wherein the at least two antennas are oriented at substantially the same angle and separated by a predefined distance;
a delay calculation module configured to calculate a delay between the received signals from the signal source at the at least two antennas;
a line of bearing (LOB) determination module configured to determine a LOB of the at least two antennas at the INS with respect to the signal source based on the delay between the signals at the at least two antennas from the signal source; and
an orientation measurement module configured to measure the orientation of the at least two antennas at the INS in a global coordinate system using the LOB.

19. The INS of claim 18, wherein the signal source includes one of a non-cooperative satellite and a cooperative satellite.

20. The INS of claim 18, wherein the at least two antennas form an interferometer or a phase array that is used to determine the delay between the signals received at the at least two antennas from the signal source.

* * * * *